United States Patent [19]

Beer et al.

[11] 4,287,388
[45] Sep. 1, 1981

[54] DRIVE-IN THEATRE SOUND DISTRIBUTION SYSTEM

[76] Inventors: Walter R. Beer; Margaret Beer, both c/o Grantville P.O., Bass Hwy., Grantville, Victoria, Australia, 3984

[21] Appl. No.: 101,518

[22] Filed: Dec. 10, 1979

[30] Foreign Application Priority Data

Dec. 19, 1978 [AU] Australia ............................. PD7157

[51] Int. Cl.³ ............................................. H04R 27/00
[52] U.S. Cl. .................................... 179/1 DD; 369/21; 369/69; 360/137; 360/132
[58] Field of Search ........... 179/1 DD, 2 D, 100.1 A, 179/100.11, 1 MN, 2 A, 100.3 R, 100.3 T, 100.1 R; 360/137, 132, 123; 340/652

[56] References Cited

U.S. PATENT DOCUMENTS

| | | | |
|---|---|---|---|
| 2,765,365 | 10/1956 | Grooh | 179/1 DD |
| 2,786,098 | 3/1957 | Alsbrook | 179/1 DD |
| 2,979,607 | 4/1961 | Herzfeld | 179/1 DD |
| 3,060,263 | 10/1962 | Mallers | 179/1 DD |
| 3,175,047 | 3/1965 | Borberg | 179/1 DD |
| 3,400,227 | 9/1968 | Lear | 179/100.11 |
| 3,700,826 | 10/1972 | O'Neal | 360/137 |
| 3,946,156 | 3/1976 | Budrose | 179/100.11 |
| 3,978,524 | 8/1976 | Gordon | 179/100.11 |

*Primary Examiner*—Alan Faber
*Attorney, Agent, or Firm*—Frost & Jacobs

[57] ABSTRACT

The invention relates to a sound distribution system for a drive-in theatre. The system comprises means for converting the sound track of a film into an audio information signal and means for transmitting the signal to at least one sound reproducing apparatus. The sound reproducing apparatus is for use with a magnetic playback apparatus having at least one playback head and a cassette or cartridge receiving aperture. The sound reproducing apparatus includes a transducer having at least one transfer head and alignment means for receiving the transfer head and for maintaining the head in a spatial position relative to the alignment means, whereby when the sound reproducing apparatus is inserted into the receiving aperture the transfer head is aligned opposite a respective playback head of the playback apparatus so that the signals may be reproduced as sound by the playback apparatus.

1 Claim, 3 Drawing Figures

DRIVE-IN THEATRE SOUND DISTRIBUTION SYSTEM

BACKGROUND OF THE INVENTION

This invention relates to a sound reproducing apparatus for converting sound represented by one form of varying energy waveform or signal, suitable for transmission, into another energy waveform or signal.

The apparatus of the invention is particularly suitable for use in the sound distribution system of a drive-in theatre and will therefore be described in relation to such a distribution system. However, it is to be understood that this description in relation to a drive-in theatre sound distribution system is by way of example only and that the apparatus of the invention has other areas of applicability.

Drive-in theatre sound distribution systems generally consist of a central unit which converts the sound track of a film into electrical signals representative of the audio information of the sound track. The sound track may have audio information coded or stored magnetically or optically and the audio information may be monoaural (singlechannel) or multichannel. The electrical signals are conducted, along a wired network, to posts located around the theatre where the signals are reconverted into sound by loudspeakers. The loudspeakers provided are generally of poor sound reproducing quality and only capable of single channel reproduction even though the film sound track may have represented multichannel sound information.

The loudspeakers are mounted on posts located at spaced positions around the theatre and a patron may arrange a speaker by either hooking it onto a window of his car or by merely passing it through an open window of the car so that sound may be heard within the car. Vandalization and accidental damage of speakers is not uncommon and is of concern to theatre operators and owners.

In an attempt at improving sound quality and reducing speaker damage a modified sound distribution system has been developed whereby the film sound track is modulated on a carrier wave and this modulated carrier wave is then transmitted in non-radiating fashion on existing loudspeaker wiring to the various posts around the theatre. The wiring at the post is terminated with connectors or suction cups rather than a speaker. The connectors may be attached to a whip aerial of a radio in the patron's car whereas the suction cups may be attached to the windshield for reception by concealed antennas. The carrier wave is of a frequency that may be tuned to any frequency of the commercial radio broadcast band and thus the signal may be demodulated by the patron's radio and replayed through the radio's sound processing facilities.

In such a system the signal is prone to noise interference from electrical machinery, the atmosphere or radio channels near the portion of the commercial band where the system is tuned to operate.

In addition, with such a radio broadcast system sound may no longer be reproduced by a loudspeaker connected direct to an outlet at a post since the audio information has been modulated. Therefore patrons who do not have radios (either fixed car radios or portable radios) with a whip aerial cannot receive the sound portion of the theatre program. It has been usual for theatre operators to provide these patrons, after payment of a security deposit, with a suitable radio receiver.

SUMMARY OF THE INVENTION

It is an object of the present invention to provide an apparatus which alleviates or minimizes some of the disadvantages of prior drive-in theatre sound systems.

Accordingly, the present invention provides a drive-in theatre sound distribution system comprising:

means for converting the sound track of a film into an audio information signal;

means for transmitting said signal to at least one sound reproducing apparatus for use with a magnetic playback apparatus having at least one playback head and a cassette or cartridge receiving aperture, said sound reproducing apparatus including:

a transducer having at least one transfer head; and alignment means for receiving said transfer head and for maintaining the latter in a spatial position relative to the alignment means whereby when said sound reproducing apparatus is inserted into the receiving aperture the transfer head is aligned opposite a respective playback head of the playback apparatus so that signals applied to said transducer, representative of sound, may be reproduced as sound by the playback apparatus.

DESCRIPTION OF THE DRAWINGS

The invention will now be described by way of example only, with reference to the accompanying drawings in which.

The apparatus 3 includes a transducer 4 capable of converting electrical signals (used as the input to a normal drive-in theatre post speaker), representative of audio information, into magnetic variations compatible for reconversion into electrical signals representative of audio information by a magnetic play-back or replay head of a magnetic recorder/playback apparatus. The transducer may comprise a magnetic transfer head capable of single channel operation. Advantageously, the transducer comprises a dual channel stereo magnetic transfer head although a larger number of channels may be employed.

If a head of the latter type is used it may be necessary to modify existing theatre speaker wiring so that signals representative of two channel information may be fed to the post outlet. Alternatively, if only single channel operation is desired, the theatre wiring may remain unmodified.

The transducer is advantageously aligned in certain spacial orientation with respect to the play-back or replay head. When a magnetic head of either type is used, the transducer is aligned so that the head gap may be positioned close and opposite to the head gap of the replay head. Any suitable alignment means or case within which the transducer is mounted may be used for this purpose. However, it is preferred that the transducer be suitably mounted in a blank or dummy cassette or cartridge so that the desired spacial orientation may be achieved. When a dummy cassette 5, that is, a cassette that has no magnetic recording tape or drive sprockets, is used it is preferred that the magnetic recorder/playback apparatus having the replay head is of the cassette variety. By utilizing a transducer suitably mounted in a dummy cassette 5 and a cassette recorder apparatus the transducer may be repeatably accurately aligned with respect to the replay head by positioning the dummy cassette 5 in the cassette receiving aperture of the cassette recorder apparatus.

Figure 1:
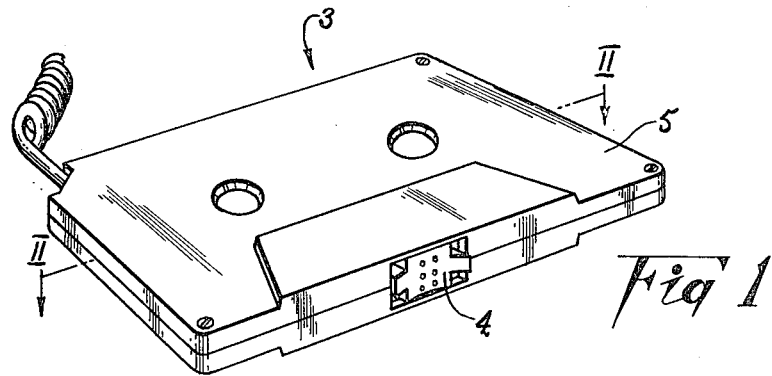
FIG. 1 is an isometric view of a sound reproducing apparatus according to a preferred form of the invention.
Figure 2:
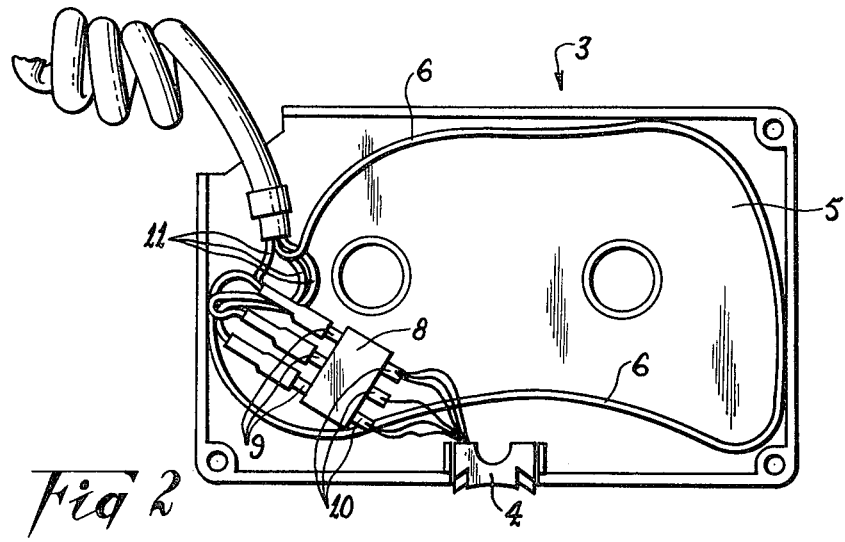
FIG. 2 is a sectional view along line II—II of FIG. 1.

Cassette apparatus either have a combined head block assembly having an erase head, record head and replay head or these items may be fitted as separate items. When separate heads for record and replay are present these heads are usually spaced one above the other in the recorder/playback apparatus. To enable the apparatus of the invention to function properly with such a recorder/playback apparatus, the transducer is preferably arranged to have three spaced heads mounted as a single assembly (as shown in FIG. 1) within the dummy cassette so that the dummy cassette may be positioned in the cassette receiving aperture with either side of the cassette uppermost (for a top loading cassette apparatus) or outermost (for a side loading cassette apparatus). In this way the heads of the apparatus of the invention may be repeatedly accurately positioned in its operative position within the cassette receiving aperture of a cassette apparatus so that the heads of the apparatus of the invention are suitably positioned opposite the replay head of the cassette apparatus.

The transducer 4 may be resiliently mounted in the dummy cassette so that, when the dummy cassette is inserted into the cassette receiving aperture, the transducer is biased towards and against the replay head of the recorder apparatus.

When the transducer is a magnetic stereo transfer head it is preferred that the recorder apparatus be also of the stereo variety so that stereo sound is reproduced although this is not essential since the stereo head is compatible with a mono replay head of a recorder apparatus.

The apparatus of the invention may also include a security surveillance loop 6 capable of providing, at a location remote from the apparatus, an indication that the connection between the apparatus and the speaker post has been severed. The surveillance loop 6 conveniently includes a continuous conductor loop through which a current may pass and means for detecting when current no longer flows. Indicator means either aural or visual (not shown) may also be present at the remote location for providing indication indicative of the particular one of the apparatuses which has had its connection severed.

Figure 3:
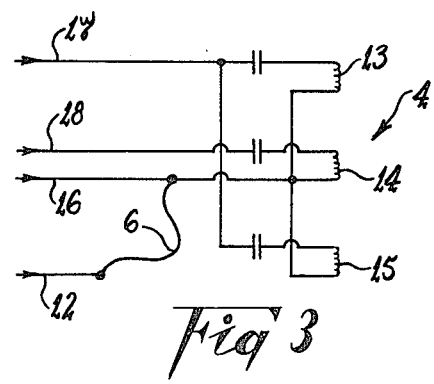
FIG. 3 shows a circuit diagram according to one form of the invention.

A terminal block 8 may be provided having terminals 9 and 10 to which incoming conductors 11 and the transducer may be respectively connected. Although the surveillance loop 6 is shown as comprising conductors separate from those conductors necessary for proper transducer operation the circuit shown in FIG. 3 may be employed. Conductor 12 together with conductor 16, which acts as the common lead, form the surveillance loop. Three heads 13, 14 and 15 are shown with heads 13 and 15 being connected in parallel. Conductors 17 and 18 provide signal paths for the parallel connected heads 13 and 15 and for head 14, respectively.

In use, the apparatus of the invention may replace existing loudspeakers at the theatre or may be connected via conductors to the speaker outlet connections and the speaker may remain also. In this latter form, if a patron does not have a cassette recorder he may use the drive-in speaker for sound reproduction in the normal way. A patron with a cassette recorder merely places the dummy cassette into his cassette recorder and sound may be reproduced through the recorder sound processing circuitry. Since the dummy cassette has no magnetic tape and must be placed into the recorder for sound to be reproduced there is no possibility of the patron illegally recording copyright sound track material.

If the theatre sound system wiring has been modified for two channel sound transmission and the transducer of the apparatus is a dual channel magnetic transfer head and the patron has a cassette recorder with stereo capabilities then stereo sound may be reproduced in the patron's car. If a patron has a recorder with only monoaural or single channel capabilities the recorder will reproduce mono sound since the dual transfer head is compatible therewith.

The apparatus of the invention has the advantage that no special sound reproducing device need be supplied by theatre operators to those not having recorders; these patrons use the existing theatre speaker network. Also it will be possible to have stereo sound reproduction and the apparatus, since it does not require signal modulation, is not affected by broadcast channels or other noise sources which affects the prior system. It should be understood that a drive-in theatre sound distrubution system will employ a plurality of the sound reproducing apparatus described above.

While the invention has been described having a dummy cassette as the alignment means it should be understood that a cartridge could also be used. In this latter case the recorder/playback apparatus would be a cartridge apparatus rather than a cassette apparatus. It should further be understood that the apparatus of the invention may function with a cassette apparatus having replay capabilities only since the cassette apparatus need not have a record head to be suitable for use with the apparatus of the invention.

What is claimed is:

1. A drive-in theatre sound distribution system comprising:
    means for converting the sound track of a film into an audio information signal;
    means for transmitting said signal to at least one sound reproducing apparatus for use with a dual channel magnetic playback apparatus having two playback heads and a cassette or cartridge receiving aperture, said sound reproducing apparatus including:
    a transducer having three transfer heads, two of which are connected in parallel;
    alignment means comprising a blank cassette or cartridge for receiving said transfer heads and for maintaining the latter in spatial position relative to the blank cassette or cartridge, whereby said sound reproducing apparatus may be inserted into the receiving aperture with either of its sides uppermost or outermost of the playback apparatus to align one of said parallel connected transfer heads and the remaining transfer head opposite respective playback heads of the playback apparatus to function so that dual channel sound may be reproduced by the playback apparatus.

* * * * *